March 4, 1941.  A. E. M. LEPETIT  2,233,950
DETENT MEANS
Filed Dec. 16, 1939
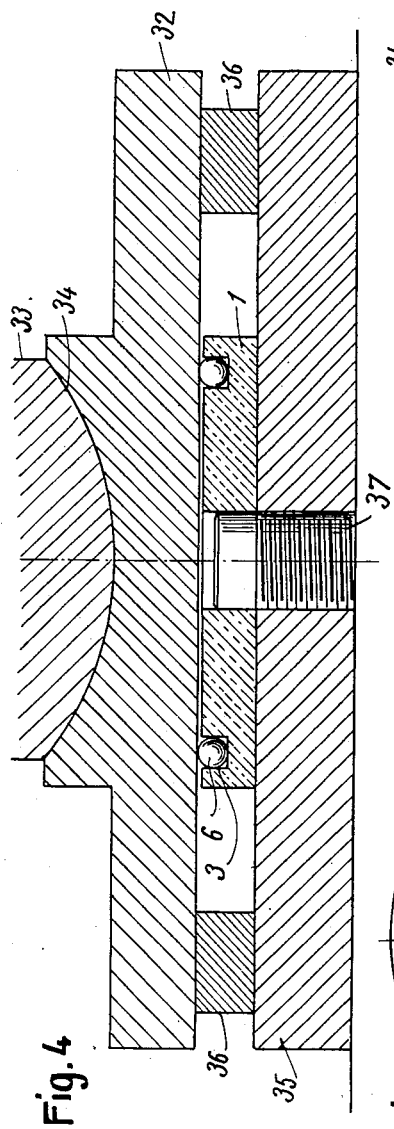
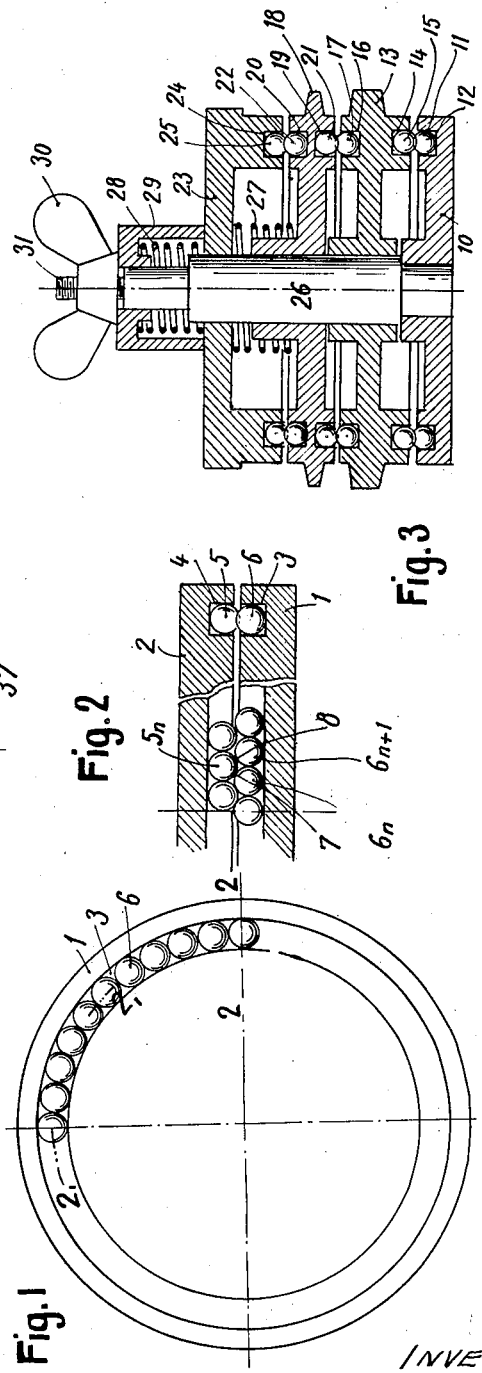
INVENTOR
A.E.M. LEPETIT Patented Mar. 4, 1941

2,233,950

UNITED STATES PATENT OFFICE 2,233,950

DETENT MEANS

Albert Emile Marcel Lepetit, Montrouge, France

Application December 16, 1939, Serial No. 309,633
In France January 16, 1939

4 Claims. (Cl. 74—527)

The object of the present invention is to provide a detent means which will enable one member to be coupled to another in very exact positions.

Another object of the invention is to provide a detent means which will ensure the exact centering of the two members in relation to one another.

A further object of the invention is to provide plant enabling the aforementioned detent means to be manufactured under the best conditions of precision and of centering.

The devices enabling the above objects to be attained present the characteristics set forth in the following description and more particularly defined in the claims annexed thereto at the end.

A detent means according to the invention, and plant according to the invention for manufacturing such a detent means, are illustrated by way of example in the accompanying drawing, in which Figure 1 is a plan view of the lower member of the detent means;

Figure 2 is a view in section along the lines 2—2 and 2¹—2¹ of the complete detent means device according to the invention;

Figure 3 is a view in axial section of a modification of this device; and

Figure 4 is an axial section of the plant for the manufacture of the detent means according to the invention.

The detent means shown in Figures 1 and 2 forms a coupling between two plates on the same axis.

The lower plate 1 for example is rigid with the carriage of a gun. It is provided with a circular groove 3. The upper plate 2, which is concentric with the lower plate, is for example rigid with the sighting appliance. It comprises a circular groove 4, exactly opposite to the circular groove 3 in the lower plate 1. In the circular groove 3 of the lower plate 1 is lodged a row of balls 6, which are forced into this groove, and are tangential to one another.

Similarly in the circular groove 4 of the second or upper plate 2 is lodged a row of balls 5, which are forced into this groove, and are also tangential to one another. These balls 5 are of the same diameter as the adjacent balls 6 in the plate 1.

The upper plate 2 rests upon the lower plate 1, not directly but through the medium of the balls 5 and 6, which bear upon one another, one ball 5n of the upper row resting upon the lower row at two points, namely at the point 7 upon a ball 6n, and at the point 8 upon the next ball 6n+1 (Fig. 2).

The balls 5 and 6 in these rows, being fixed in the grooves 3 and 4, cannot slide longitudinally in these grooves.

When an angular displacement is given to the upper plate 2 relatively to the lower plate 1 the upper balls 5 slide over the lower balls 6, the upper plate 2 rising slightly each time the upper balls 5 reach a position vertically above the lower balls 6.

The cessation of the displacement can only occur in a definite position, for which the upper balls 5 fall into the intervals between the lower balls 6, as illustrated in Figure 2. At this moment the plates are secured in position relatively to one another in a manner which cannot be disturbed even as a result of the shocks due to the firing recoil.

The device described above presents in addition the following technical advantages:

(a) It is easy to procure bearing balls which are very hard and very accurately calibrated;

(b) Each ball is in contact with the opposite row at two points only, and therefore friction is reduced.

The device illustrated in section in Figure 3 is a modification of the invention, comprising:

(a) A lower or first plate 10 comprising a circular groove 11, in which is fixed a row of balls 12;

(b) A second or intermediate plate 13 comprising two circular grooves 14 and 16, namely the lower circular groove 14 which is formed upon the face of the plate that is directed towards the first plate 10, and in which is fixed a row of balls 15, and an upper circular groove 16, which is cut in the face of the plate 10 remote from the first plate, and in which is fixed a row of balls 17;

(c) A third or intermediate plate 18, with grooves 19 and 20 and fixed rows of balls 21 and 22; and (d) A fourth or upper plate 23, with a lower groove 24, in which is fixed a row of balls 25.

The plates 10, 13, 18 and 23 are mounted upon a common shaft 26. A spring 27 is interposed between the plates 18 and 23. A second spring 28, lodged in a hood 29, is compressed by means of a butterfly nut 30 screwed on to the threaded end 31 of the common shaft 26. This spring presses the rows of balls resiliently against one another.

The balls in contact with one another are of the same diameter, but the diameter of the balls 22 and 25 is different from that of the balls 17 and 21, which in its turn is different from that of the balls 12 and 15. This device enables the upper plate 23, which is rigid for example with the sighting device, to be secured in positions very close to one another, the balls of the largest diameter permitting, by relative displacement, of the stoppage of the upper plate at spaced positions, and the balls of the smaller diameters permitting of the positioning of the sighting appliance at intermediate points.

The ball plates of the device according to the invention are manufactured by the aid of the machine illustrated in Figure 4.

This machine comprises a pressing plate 32, having its lower face horizontal, this plate being mounted by its upper face upon a press platen 33, through the medium of a ball and socket joint 34. This plate can be lowered against a horizontal table 35. Upon the edges of this table 35 are arranged wedges or keys 36 of a suitable height. The table 35 carries at its centre a shaft 37, upon which is engaged the plate 1 into which the balls 6 are to be forced.

These balls 6 are placed upon the groove 3 in the plate, and the press is set in action in such a manner that the pressing plate 32 descends until it bears upon the wedges 36. In this movement the balls 6 are forced into the groove 3.

Owing to the presence of the wedges 36, which are perfectly adjusted in relation to the plane table 35, the tangent plane to the balls 6, after these balls have been forced into the groove, is strictly parallel to the table 35, and therefore to the lower face of the plate 1.

The various ball plates of the device being manufactured in this manner, the planes of contact of the rows of balls are strictly parallel to the bearing faces of the plates, and are therefore strictly perpendicular to the common axis of rotation of these plates. In this way very exact and correctly centered appliances are easily obtained.

What I claim is:

1. In a clutch, a first plate, a row of balls fixed to this first plate, a second plate coaxial with the first plate, a row of balls fixed to the second plate, and gripping means urging the plates towards one another, the balls of each plate engaging between the adjacent balls and the other plate.

2. In a clutch, a first plate, a row of balls tangential to one another and fixed to this first plate, a second plate coaxial with the first plate, a row of balls tangential to one another fixed to the second plate, the balls of the second row being of the same diameter as the balls of the first row, and gripping means urging the plates towards one another, the balls of each plate engaging between the adjacent balls of the other plate.

3. In a clutch, a first plate formed with a groove, a row of balls forced into this groove, a second plate coaxial with the first plate and formed with a groove, a row of balls forced into this groove, and gripping means urging the plates towards one another, the balls of each plate engaging between the adjacent balls of the other plate.

4. In a clutch, a first plate, a row of balls fixed to this first plate, a second plate coaxial with the first plate, a row of balls fixed to the second plate upon the surface thereof that faces the first plate, these balls being of the same diameter as the balls of the first plate, a row of balls fixed to the second plate upon the face thereof remote from the first plate, the diameter of these balls being different from that of the balls of the first plate, a third plate coaxial with the first and second plates, a row of balls fixed to the third plate upon the surface thereof facing the second plate, the diameter of these balls being the same as that of the adjacent balls of the second plate, and gripping means urging the plates towards one another, the balls of each plate engaging between the adjacent balls of the other plate.

ALBERT EMILE MARCEL LEPETIT.